United States Patent [19]

Kopp

[11] 4,248,648
[45] Feb. 3, 1981

[54] METHOD OF REPAIRING LEAKS IN A HOLLOW CAPILLARY FIBER DIFFUSION DEVICE

[75] Inventor: Clinton V. Kopp, Barrington, Ill.

[73] Assignee: Baxter Travenol Laboratories, Inc., Deerfield, Ill.

[21] Appl. No.: 58,588

[22] Filed: Jul. 18, 1979

[51] Int. Cl.³ .............................................. B32B 35/00
[52] U.S. Cl. ..................................... 156/94; 156/285; 156/286; 156/382; 264/36
[58] Field of Search ................. 156/94, 285, 286, 382; 264/36

[56] References Cited
U.S. PATENT DOCUMENTS

| | | | |
|---|---|---|---|
| 3,499,062 | 3/1970 | Geary et al. | 264/36 |
| 4,105,731 | 8/1978 | Yamazaki | 156/289 X |
| 4,170,695 | 10/1979 | Brown et al. | 264/36 X |

Primary Examiner—William A. Powell
Assistant Examiner—Robert A. Dawson
Attorney, Agent, or Firm—Paul C. Flattery; Garrettson Ellis

[57] ABSTRACT

The method of repairing leaks in a bundle of hollow capillary fibers of a diffusion device disposed in a housing comprises temporarily sealing one end of the bundle of fibers, applying a curable sealant paste to the other end of the bundle of fibers, and then applying a suction pressure to the flow path which passes through the bundle on the exterior of the fibers. Wherever a hollow fiber has a leak, the suction pressure will be transferred to the interior of the fiber, to individually cause the fiber to suck the curable sealant paste into its interior, thus blocking the fiber and preventing flow through it.

10 Claims, 4 Drawing Figures

METHOD OF REPAIRING LEAKS IN A HOLLOW CAPILLARY FIBER DIFFUSION DEVICE

BACKGROUND OF THE INVENTION

The hollow fiber dialyzer is a well known commercial capillary fiber diffusion device, which is sold by several companies and covered by numerous patents. One commercially available version of the hollow fiber dialyzer is the CF Capillary Fiber Dialyzer sold by Travenol Laboratories, Inc.

This family of dialyzers comprises a bundle of hollow capillary fibers made of a cellulose-based material, retained in a tubular housing so that a first flow path is defined through the bores of the fibers in the bundle, and a second flow path extends through the bundle between the capillary fibers.

In the event where the device is a dialyzer for blood, the blood typically passes through the first flow path through an axially disposed inlet with respect to the bundle.

The dialysis solution then passes through the second flow path in contact with the exterior surface of the capillary fibers.

During the assembly process, which requires the assembly of a bundle containing several thousand capillary fibers, it is not infrequent for one more of the capillary fibers to break or otherwise form a leak, so that there is a communication between the first and second flow paths. This may be discovered on testing, and renders the capillary fiber diffusion device useless, since the blood can then pour through the broken fiber into the dialysate flow path which is, of course, unacceptable.

If the fiber could be repaired or eliminated from the bundle, the remaining thousands of capillary fibers would remain capable of providing effective dialysis or other diffusion as is desired, but this has, of course, proven to be impossible since finding and repairing the one or two defective fibers in the bundle is similar to the famous situation of finding a needle in the haystack. Also, it is practically impossible to remove the defective fibers without disrupting the bundle, even if they could be found.

In accordance with this invention, a technique is found for reliably repairing leaks in the bundle of capillary fibers of a diffusion device by inactivating the few defective fibers, while permitting the remaining intact fibers to continue to be operational.

The invention of this application may be used with any hollow fiber diffusion device, including particularly dialyzers for blood, but also including hollow fiber oxygenators, ultrafiltration devices, membrane plasmapheresis devices, and other devices. The membrane plasmapheresis device is used to extract plasma from whole blood by permitting the plasma to pass through an appropriate and well known type of membrane, while preventing the blood cells from passing therethrough.

DESCRIPTION OF THE INVENTION

In accordance with this invention, a method of repairing leaks in a bundle of hollow capillary fibers, for example, a bundle for a diffusion device, is provided in which the bundle of fibers is preferably disposed in a housing to define a first flow path through the bores of the fibers, and a second flow path extending through the bundle between the capillary fibers.

The first and second flow paths are normally sealed from each other, except in the instance of the broken fibers which are to be repaired.

In accordance with this invention, one end of the bundle of fibers is temporarily sealed. A curable sealant paste, for example, silicone room temperature vulcanizing (RTV) rubber, is applied without substantial pressure to the other end of the bundle of fibers.

A suction is then applied to the second flow path, with the result that any capillary fibers which have a leak will exert suction from the second flow path to draw the curable sealant into the bore of the leaking fiber.

Following this, the sealant is allowed to cure preferably by simply letting the arrangement stand for the required period of time in the case of the spontaneously curable sealants, or otherwise by taking necessary steps to cure the sealant, with the result the sealant permanently occludes the leaking fiber, eliminating the leak in the dialyzer.

After the curing step, the end of the bundle which carries the sealant may be cut away, generally with a thin slice on the order of 0.01 to 0.1 inch, to remove the sealant which does not occupy a bore of the leaking fiber. The temporary seal of the other end of the bundle of fibers may then be removed.

It is also generally preferred to seal one end of the second flow path with a plug and to apply a suction to the other end of the second flow path by means of any desired source of vacuum.

A typical application of vacuum can be reduced pressure of over 400 mm of mercury below ambient atmospheric pressure, for a period of time, on the order of 5 to 20 minutes.

It may be desirable to apply the leak sealing method of this invention to the other end as well of the same bundle by simply applying the sealant to the other end, processing it as described above, and then cutting a thin slice off of that end.

Alternatively, both ends of the bundle may have sealant applied simultaneously, with each layer of sealant on its respective end serving as the temporary seal, as called for above, for the sealant on the other end. In this manner, both ends of each broken fiber may be simultaneously sealed by application of suction in the second flow path.

Figure 1:
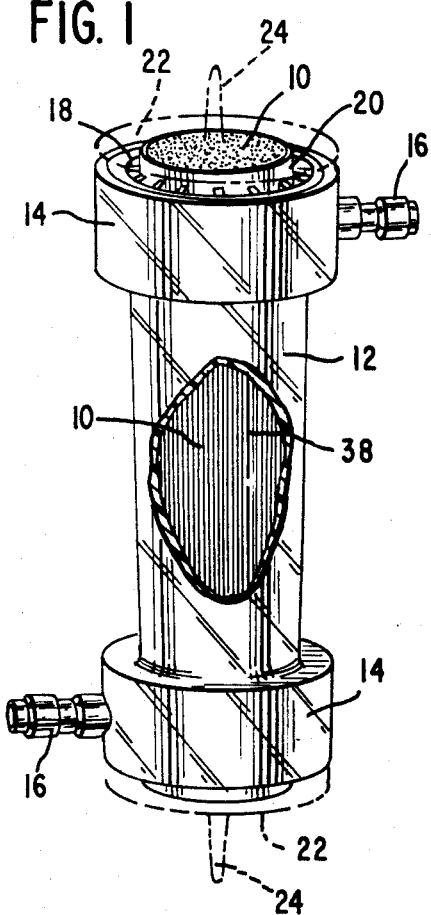
FIG. 1 is a perspective view, with a portion broken away, of a bundle of hollow, capillary fibers enclosed in a housing, prior to application of the end manifolds for the first or blood flow path.

Referring to the drawings, a bundle of hollow capillary fibers 10 is shown, comprising for example a commercial capillary fiber bundle for a dialyzer. Bundle 10 is enclosed in a housing 12, defining relatively enlarged end pieces 14 defining manifold chambers for dialysis solution in the second flow path as described above, each end piece carrying a sealable port member 16 for conventional connection with a source of dialysis solution. Port members may be on the same side of housing 12, or on opposite sides as shown.

Each end piece 14 may define an inner end piece 18 which, in turn, defines a short, inner retention sleeve 20 for centering and appropriately spacing fiber bundle 10. Inner end piece 18 may comprise a unitary structure made of a polyvinyl chloride based plastic material, for example, and comprises an aperture to align with port 16.

The end manifolds 22 are shown in dotted line because they are to be applied at a later stage of the manufacturing operation, for example, by a heat or solvent sealing technique, to provide manifolding for the first flow path, which in the instance of a hollow fiber dialyzer is generally for blood. Each manifold 22 may define a spike member 24 for connection with arterial and venous blood sets in a dialysis circuit.

Figure 2:
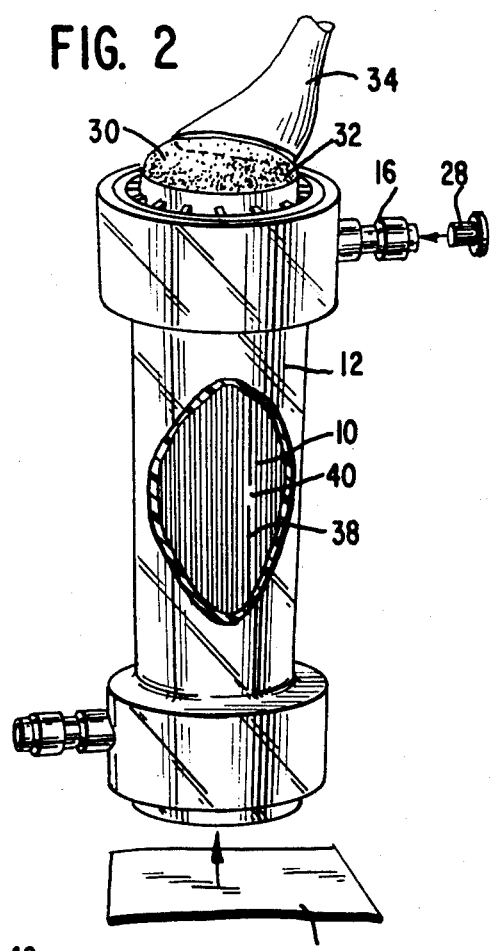
FIG. 2 is a perspective view of the semi-finished dialyzer of FIG. 1 with a portion broken away, showing initial steps of the method of this invention in process.
Figure 4:
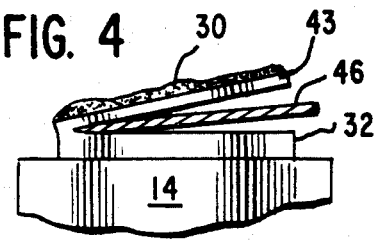
FIG. 4 is a fragmentary, elevational view of the step of cutting away the sealant layer shown in FIG. 3.
Figure 3:
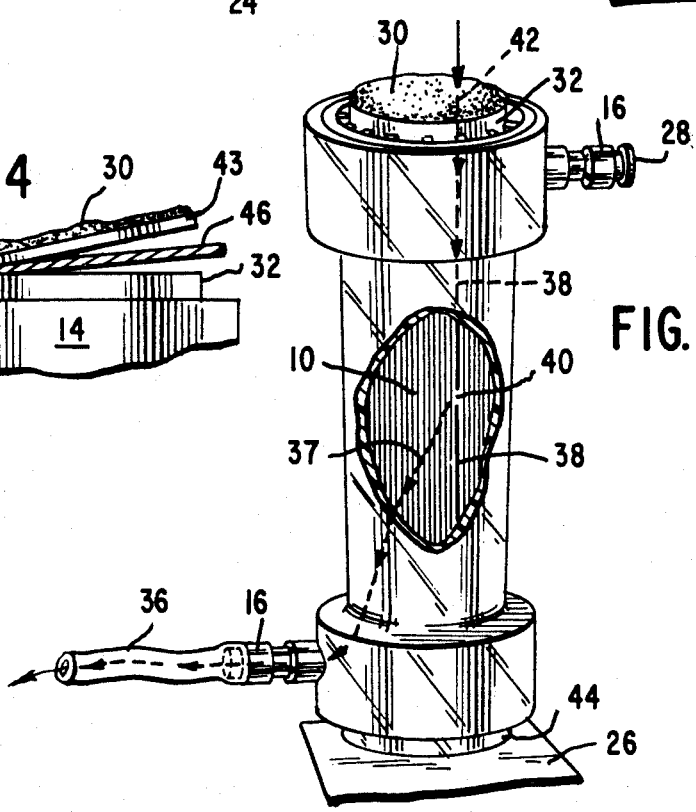
FIG. 3 is a similar perspective view of the semifinished dialyzer of FIG. 2, showing a later step of the process of this invention.

In accordance with this invention, and as shown in FIG. 2, one end of the bundle 10, disposed in housing 12, in sealed by the temporary application, for example, of an air impermeable plastic sticker 26. Sticker 26 may be square as shown, or may be cut to fit the cross sectional shape of bundle 10 and thus be of round shape. Alternatively, the sealing of one end of the bundle 10 as required in this invention may be accomplished by the application of a layer of curable sealant, with a curable sealant layer being applied to both ends of the bundle so that, if desired, both ends of the broken fibers in the bundles may be occluded and sealed from flow.

Plug 28 may be applied to one of the ports 16 communicating with the second flow path passing between the individual fibers of the bundle 10.

Layer of sealant 30, for example a one component room temperature vulcanization (RTV) silicone sealant such as General Electric 102 or 108, may be laid upon or applied, preferably with a minimum of pressure, to the end 32 of bundle 10 by means of a conventional applicator 34. The entire end of bundle 32 is covered. The pressure of application of sealant is kept to a minimum so as to minimize the pressing of uncured sealant into the aperatures of the capillary tubing. The sealant used is preferably self-supporting and non-flowing except under pressure, so that the sealant does not spontaneously flow into bores of fiber 10.

If desired, sealant applicator 34 may have an elongated orifice of approximately the diameter of bundle 10, so as to permit the application of a layer of uncured sealant 30 to the end of bundle 10 in a single pass of the applicator 34.

Following this, a vacuum line 36 is applied to the other connector member 16 which is not blocked by plug 28, to exert a suction of, typically, 600 mm of mercury below normal atmospheric pressure for about 10 minutes. During this period of time, the broken fibers, exemplified by fiber 38 having a broken point 40, have a bore which is in flow communication with the suction pressure in the second flow path, exerted through conduit 36 and symbolized by arrows 37. Accordingly, suction is exerted on the bore of capillary fiber 38, with the result the end 42 of capillary fiber 38 which is exposed to the sealant 30 draws the uncured sealant into the bore of the fiber for a substantial distance, impelled by the suction in the bore of fiber 38. However, the remaining fibers, which are intact, do not encounter a significant suction effect in their interiors. Accordingly, sealant 30 is not drawn into the bores of those fibers to the same degree as fiber 38.

Following the application of suction, the end 32 may have a small portion of itself 43 sliced away by knife 46. End portion 43 may have a thickness of 0.01 to 0.1 inch, for example, to remove the sealant which does not occupy a bore of a leaking fiber. Any marginal amount of penetration of the sealant into the bore of intact fibers may be eliminated by this cutting step, since those portions will be removed. At the same time, the much greater depth of penetration of sealant in the broken fiber will give the result that the fiber 38 remains occluded after the slicing or cutting step. Accordingly, as the sealant cures, which may be either before or after the slicing step, fiber 38 becomes inactivated.

Thus, after preferably both ends of the leaking fibers 38 are sealed in accordance with this invention by a process involving sequentially processing the ends 32, 44 of the dialyzer as described above, or simultaneously processing both ends thereof, the dialyzer is ready for application of the end manifolds 22 and for retesting, sterilization and packing for delivery to the user.

As an alternative processing technique in accordance with this invention, dialyzers are tested for leaking ends by sealing one end of the bundle 10 and applying pressurized carbon dioxide to the other end of the bundle. One or both ends may indicate a leak when tested this way. When a fiber is broken, usually both ends leak and must be sealed. However, when a fiber is merely short, one end may be properly sealed and non-leaking, while the other end of bundle 10, communicating with the short fiber, may exhibit a leakage. By this, it can be determined which of the ends of the bundle need processing in accordance with this invention.

Thereafter, pressurized air may be placed through port 16 to pressurize the second flow path. The dialyzer may be immersed in a Freon liquid, and the location of the bubbles emerging from one or both of the ends of the bundle 10 may be noted and marked.

In this instance, the RTV material does not have to be applied across the entire surface of the end of bundle 10, but only in the general location where the bubbles are formed. During the blowing step, while immersed in the Freon liquid, the non-leaking end may be capped.

The Freon liquid is, of course, preferably removed by air blowing, prior to the sealing technique with RTV sealant in accordance with this invention.

When the vacuum in accordance with this invention is applied, the RTV material typically enters the broken or short fiber for a distance of about one-quarter inch while entering the unbroken fibers only a neglible distance, if any. Preferably, a vacuum of 600 to 700 mm of mercury below ambient pressure is used.

An advantage of this technique is that the clean up of the dialyzer is simplified, in that RTV material is less likely to be spilled onto the housing parts of the dialyzer, since a smaller amount is being applied.

The above has been offered for illustrative purposes only, and is not intended to limit the invention of this application, which is as defined in the claims below.

That which is claimed is:

1. The method of repairing leaks in a bundle of hollow capillary fibers of a diffusion device, said bundle of fibers being disposed in a housing to define a first flow path through the bores of said fibers, and a second flow path extending through said bundle between the capillary fibers, said first and second flow paths being normally sealed from each other, which method comprises:
temporarily sealing one end of said bundle of fibers;

applying a sealant paste to the other end of said bundle of fibers, said sealant paste being essentially self-supporting and non-flowing except under pressure:

applying a suction to the second flow path, whereby any capillary fibers which have a leak will exert suction from said second flow path to draw said sealant into the bore of said leaking fiber to thereby permanently occlude said leaking fiber.

2. The method of claim 1 in which the end of said bundle which carries the sealant is thereafter cut away to remove said sealant which does not occupy a bore of a leaking fiber.

3. The method of claim 2 in which said one end of the bundle of fibers is temporarily sealed by application of an air impermeable sticker over the end thereof.

4. The method of claim 2 in which suction is applied to the second flow path by placing a temporary plug member into one end thereof and applying a suction to the other end.

5. The method of claim 2 in which the suction applied to the second flow path is in excess of 400 mm of mercury below normal ambient atmospheric pressure.

6. The method of claim 5 in which said suction is applied for five to twenty minutes.

7. The method of claim 2 in which said bundle of hollow capillary fibers in its housing is intended for use as a dialyzer for blood.

8. The method of claim 2 performed on both ends of said bundle, said ends being simultaneously coated with said sealant paste.

9. The method of claim 2, performed on both ends of said bundle sequentially.

10. The method of claim 2 in which said curable sealant paste is a silicone rubber RTV.

* * * * *